United States Patent Office 3,492,298
Patented Jan. 27, 1970

3,492,298
OXAZINO-BENZOTHIAZINE-6,6-DIOXIDES
Chris Royce Rasmussen, Ambler, Pa., assignor to McNeil Laboratories, Inc., a corporation of Pennsylvania
No Drawing. Filed Feb. 21, 1968, Ser. No. 707,281
Int. Cl. C07d 99/00, 93/02; G02b 5/22
U.S. Cl. 260—243                            4 Claims

ABSTRACT OF THE DISCLOSURE 2H,5H - 1,3-oxazino[5,6-c]1,2-benzothiazine-2,4(3H)-dione-6,6-dioxides of the formula:

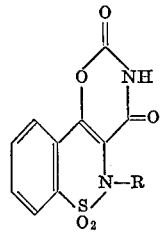

are produced, wherein R is hydrogen or lower alkyl, which are useful as ultra-violet light absorbers.

This invention relates to novel oxazino-benzothiazine-6,6-dioxides and, more particularly, to 2H,5H-1,3-oxazino[5,6 - c]1,2 - benzothiazine - 2,4(3H) - dione - 6,6 - dioxide and derivatives thereof. These compounds are structurally represented by the following formula:

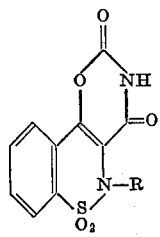

wherein R is a member selected from the group consisting of hydrogen and lower alkyl.

The compounds of Formula I are prepared by fusion of 4-hydroxy-3-(lower alkoxycarbonyl)carbamoyl-2-R-2H-1,2-benzothiazine-1,1-dioxide of Formula II, wherein R is as previously defined. These latter compounds are part of the subject matter of my copending application Ser. No. 688,298, filed Nov. 30, 1967.

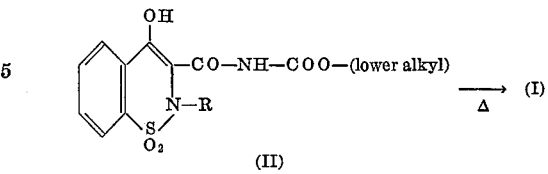

The starting materials (II), wherein R is hydrogen (II–a) are readily obtained by acylation of 3-carbamoyl-4-hydroxy-2H-1,2-benzothiazine-1,1-dioxide (III) with slightly more than one equivalent of an appropriate lower alkyl chloroformate in dimethylformamide (DMF) in the presence of alkoxide ion. The alkoxide ion is preferably the same as the alkyl moiety of the chloroformate acylating agent. The thus-obtained N-unsubstituted derivative of (II) is then alkylated with an appropriate lower alkyl halide to yield the corresponding compounds of Formula II wherein R is lower alkyl (II–b). Alternatively, these latter compounds may be prepared by first alkylating (III) with an appropriate lower alkyl halide and then acylating the thus-obtained 2-alkyl-3-carbomoyl-4-hydroxy-2H-1,2-benzothiazine-1,2-dioxide (IV) with a large excess of an appropriate lower alkyl chloroformate in aqueous alkali metal hydroxide or carbonate. The following diagramatic scheme illustrates the preparation of the Formula II starting materials:

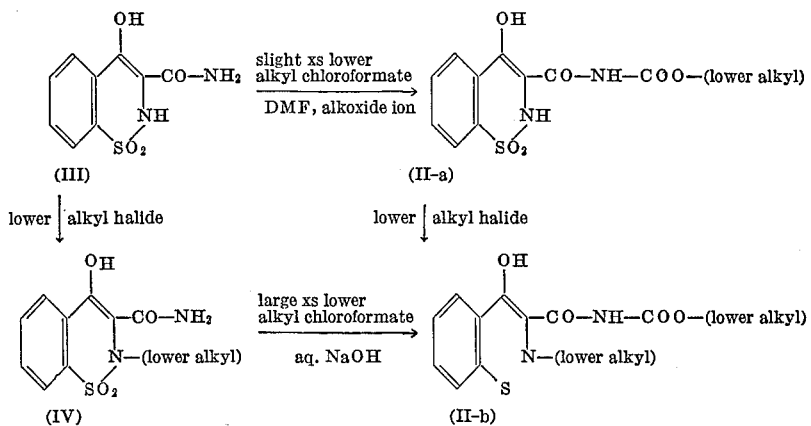

The compound, 3-carbamoyl-4-hydroxy-2H-1,2-benzothiazine-1,1-dioxide of Formula III, is obtained by conventional ammonolysis of the ester, ethyl-4-hydroxy-2H-1,2-benzothiazine-3-carboxylate-1,1-dioxide (V), which in turn may be prepared from the N-(ethoxycarbonylmethyl derivative of saccharin (VI), also known as ethyl 3-oxo-1,2-benzisothiazolin-2-acetate-1,1-dioxide, by heating at about 70° C. in absolute ethanol for about 2 hours in the presence of ethoxide ion:

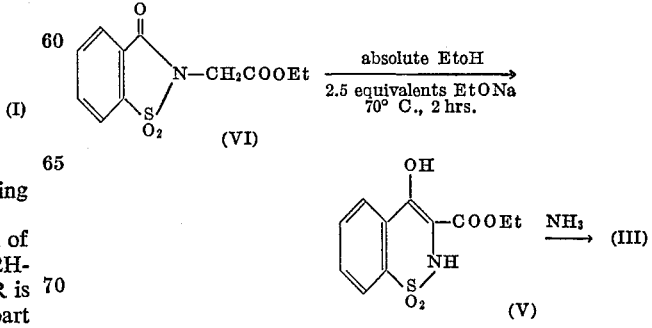

The compounds (I) of this invention absorb ultra-violet (U.V.) light at over 300 mµ which makes them useful as U.V.-screening materials. Because of their general solubility in organic materials, they may be used as U.V.-absorbers in plastics and resins, such as, for example, polystyrene, polyethylene, polypropylene, polyacrylics (e.g., methacrylate resins, polyacrylamides, polyacrylonitrile fibers, etc.), polyamide (e.g. nylon) fibers and polyester fibers. The inclusion of about 0.01–5.0 percent of the obsorber, based on the polymer weight, is usually sufficient to render protection against ultra-violet light, such as in plastic films, filters, etc. The absorber may be incorporated into the mixture of monomers before polymerization to form the polymer or it may be incorporated into the polymer at other stages during its handling, as by milling into the polymer together with other compounding ingredients, or during the spinning of polymers into fibers, etc.

The following examples are intended to illustrate, but not to limit, the scope of the present invention.

EXAMPLE I

Ethyl 4-hydroxy-2H-1,2-benzothiazine-3-carboxylate-1,1-dioxide

To a solution of 42.6 g. (1.85 g. atoms) of sodium dissolved in 800 ml. of absolute ethanol at 40° C. is added 249.5 g. (0.926 mole) of ethyl 3-oxo-1,2-benzisothiazoline-2-acetate-1,1-dioxide. The yellow mixture is warmed to 58–70° C. for 2 hrs. During the course of the reaction, a yellow sodium salt separates. The reaction mixture is then poured into an ice-concentrated aqueous hydrochloric acid (150 ml.) mixture. The resulting viscous light yellow liquid is extracted into ether (1× 2 liters; 1× 1 liter). The combined ether extracts are dried over sodium sulfate-Norite A and the solvent is removed in vacuo to leave a viscous residue containing some suspended crystals. Ether trituration affords a first crop of ethyl 4-hydroxy-2H-1,2-benzothiazine-3-carboxylate-1,1-dioxide, M.P. 139–141° C., which is filtered off. To the ether filtrate is added benzene (200 ml.) and a few milliliters of cyclohexane. Overnight standing at 10–15° C. affords a second crop of the product. Recrystallization of the combined crops from acetone-benzene yields pure ethyl 4-hydroxy-2H-1,2-benzothiazine-3-carboxylate-1,1-dioxide as large irregular almost colorless crystals, M.P. 139.5–141.5° C.

*Analysis.*—Calcd. for $C_{11}H_{11}NO_5S$ (269.28): C, 49.06; H, 4.12; N, 5.20; S, 11.91%. Found: C, 49.12; H, 4.18; N, 4.88; S, 11.89%.

EXAMPLE II 3-carbamoyl-4-hydroxy-2H-1,2-benzothiazine-1,1-dioxide

A solution of 13.45 g. (0.05 mole) of ethyl-4-hydroxy-2H-1,2-benzothiazine-3-carboxylate-1,1-dioxide in 300 ml. of aqueous ammonia (28%) is allowed to stand at room temperature for two days. Removal of most of the excess ammonia and water in vacuo gives a yellow suspension of solid. Neutralization of residual ammonia with 10% hydrochloric acid affords a crude precipitate of the product. Recrystallization of the precipitate from acetone-ethanol-water gives the pure product, 3-carbamoyl-4-hydroxy-2H-1,2-benzothiazine-1,1-dioxide, as fine colorless needles (about 76% yield); M.P. 239–242° C.

*Analysis.*—Calcd. for $C_9H_8N_2O_4S$ (240.25): C, 45.00; H, 3.36; N, 11.66; S, 13.35%. Found: C, 45.10; H, 3.32; N, 11.64; S, 13.35%.

EXAMPLE III 3-(ethoxycarbonyl)carbamoyl-4-hydroxy-2H-1,2-benzothiazine-1,1-dioxide To 50 ml. of absolute ethanol is added 2.76 g. (0.12 g. atom) of sodium. After solution of the sodium is complete, the excess ethanol is removed in vacuo and 75 ml. of DMF is added to the residue. There is then added 24.0 g. (0.1 mole) of 3-carbamoyl-4-hydroxy-2H-1,2-benzothiazine-1,1-dioxide. After the latter has dissolved, 12.96 g. (0.12 mole) of ethyl chloroformate is added slowly with stirring. The mixture is stirred at room temperature for 1 hr. and then most of the DMF is removed in vacuo. The oily residue is treated with water and allowed to stand till it crystallizes. Filtration gives the crude product, M.P. 183–185° C. Two recrystallizations from acetone-water gives the pure material, 3-(ethoxycarbonyl)carbamoyl-4-hydroxy - 2H - 1,2-benzothiazine-1,1-dioxide; M.P. 192–193° C.

*Analysis.*—Calcd. for $C_{12}H_{12}N_2O_6S$ (312.30): C, 46.15; H, 3.87; S, 10.27%. Found: C, 46.00; H, 3.88; S, 10.19%.

EXAMPLE IV 3-(ethoxycarbonyl)carbamoyl-4-hydroxy-2-methyl-2H-1,2-benzothiazine-1,1-dioxide To a solution of 0.34 g. (0.005 mole) of sodium ethoxide in 10 ml. of DMF is added 1.2 g. (0.004 mole) of 3 - (ethoxycarbonyl)carbamoyl-4-hydroxy-2H-1,2-benzothiazine-1,1-dioxide. After solution is complete, 2 ml. of methyl iodide is added. After stirring at room temperature for 1 hr., water is added. The resulting crystals are filtered off and triturated with acetone to yield the product as an insoluble solid. Recrystallization from dioxane-1,2-dimethoxyethane-acetone affords 3-(ethoxycarbonyl)carbamoyl-4-hydroxy-2-methyl - 2H - 1,2 - benzothiazine-1,1-dioxide, M.P. 196–202° C. (dec.) The I.R. and U.V. spectra are identical in all aspects with that obtained from Example VI.

EXAMPLE V 3-carbamoyl-4-hydroxy-2-methyl-2H-1,2-benzothiazine-1,1-dioxide

A solution of 1.265 g. (0.055 g. atom) of dissolved sodium in methanol is taken to near dryness in vacuo. To the residue is added 50 ml. of DMF followed by 12.0 g. (0.05 mole) of 3-carbamoyl-4-hydroxy-2H-1,2-benzothiazine-1,1-dioxide. When solution of the latter is complete, 7.81 g. (0.055 mole) of methyl iodide is added in one portion with stirring. The color of the solution quickly fades to light yellow. The mixture is heated on a steam bath for 1 hr., the DMF is removed in vacuo and the residue is treated with excess water. The resulting crystals are collected and recrystallized twice from acetone-methanol to give the product, 3-carbamoyl-4-hydroxy - 2 - methyl-2H-1,2-benzothiazine-1,1-dioxide; M.P. 240–245° C. (dec.).

*Analysis.*—Calcd. for $C_{10}H_{10}N_2O_4S$ (254.27): C, 47.24; H, 3.96%. Found: C, 47.22; H, 4.08%.

EXAMPLE VI 3-(ethoxycarbonyl)carbamoyl-4-hydroxy-2-methyl-2H-1,2-benzothiazine-1,1-dioxide A solution of 7.62 g. (0.03 mole) of 3-carbamoyl-4-hydroxy-2-methyl-2H-1,2-benzothiazine-1,1-dioxide in 25 ml. of aqueous sodium hydroxide (10%) is vigorously stirred while 6 ml. of ethyl chloroformate is added. Repeated additions of base and ethyl chloroformate are carried out to maintain alkaline conditions (pH 8–9) and until no further precipitation of product (as sodium salt) is noticed. Solid sodium chloride to saturate the solution is added and the resulting product is collected and washed with saturated sodium chloride solution. Dissolving the salt in warm water and acidification with dilute hydrochloric acid yields 3 - (ethoxycarbonyl)carbamoyl-4-hydroxy-2-methyl-2H-1,2-benzothiazine-1,1-dioxide. Recrystallization from dioxane gives the pure material, M.P. 196–202° C.

*Analysis.*—Calcd. for $C_{13}H_{14}N_2O_6S$ (326.34): C, 47.85; H, 4.32%. Found: C, 47.87; H, 4.49%.

EXAMPLE VII

2H,5H-1,3-oxazino[5,6-c]1,2-benzothiazine-2,3(3H)-dione-6,6-dioxide

A test tube containing 1.0 g. (0.0032 mole) of 3-(ethoxycarbonyl)carbamoyl-4-2H-1,2 - benzothiazine-1,1-dioxide is placed in an oil bath preheated to about 200° C. After gas evolution of the melt ceases and the contents of the tube become solid, the tube is removed and cooled. The resulting solid is triturated with acetone and filtered, giving about 0.4 g. of crude product. Recrystallization from acetone affords an analytical sample of 2H,5H - 1,3-oxazino[5,6-c]1,2-benzothiazine-2,4(3H-dione-6,6-dioxide; M.P. 292–294° C. (dec.).

*Analysis.*—Calcd. for $C_{10}H_6N_2O_5S$ (266.24): C, 45.12; H, 2.27; S, 12.04%. Found: C, 45.28; H, 2.50; S, 11.96%.

EXAMPLE VIII

5-methyl-2H,5H-1,3-oxazino[5,6-c]1,2-benzothiazine-2,4-(3H)-dione-6,6-dioxide A large test tube containing 8.4 g. (0.0258 mole) of 3-(ethoxycarbonyl)carbamoyl) - 4 - hydroxy-2-methyl-2H-1,2-benzothiazine-1,1-dioxide is immersed in an oil bath at 195° C. The temperature is allowed to rise slowly to 205° C. Melting occurs at about 200° C. The melt is stirred with a glass rod at these temperatures for 15–20 min. during which time the melt sets to a semisolid mass. Cooling and trituration with acetone yields about 5.2 g. of crude product. Two recrystallizations from acetone afford an analytical sample of 5-methyl-2H,5H-1,3-oxazino[5,6-c]1,2 - benzothiazine-2,4(3H)-dione-6,6-dioxide M.P. 264–267° C.

*Analysis.*—Calcd. for $C_{11}H_8N_2O_5S$ (280.27): C, 47.14; H, 2.88; N, 10.00; S, 11.44%. Found: C, 47.15; H, 2.92; N, 9.82; S, 11.55%.

What is claimed is:

1. A 2H,5H - 1,3-oxazino[5,6-c]1,2-benzothiazine-2,4-(3H)-dione-6,6-dioxide having the formula:

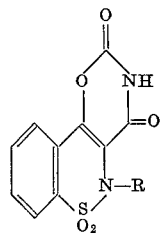

wherein R is a member selected from the group consisting of hydrogen and lower alkyl.

2. 2H,5H - 1,3 - oxazino[5,6-c]1,2-benzothiazine-2,4-(3H)-dione-6,6-dioxide.

3. 5-(lower alkyl)-2H,5H-1,3-oxazino[5,6-c]1,2-benzothiazine-2,4(3H)-dione-6,6-dioxide.

4. 5 - methyl - 2H-5H-1,3-oxazino[5,6-c]1,2-benzothiazine-2,4(3H)-dione-6,6-dioxide.

References Cited

UNITED STATES PATENTS

| 3,198,793 | 8/1965 | Hilger et al. | 260—243 |
| 3,408,347 | 10/1968 | Shavel et al. | 260—243 |
| 3,420,823 | 1/1969 | Waring | 260—243 |
| 3,427,311 | 2/1969 | Loev | 260—243 |

HENRY R. JILES, Primary Examiner

JOHN M. FORD, Assistant Examiner

U.S. Cl. X.R.

262—300; 260—458

PO-1050
(5/69)

UNITED STATES PATENT OFFICE
CERTIFICATE OF CORRECTION

Patent No. 3,492,298                    Dated    January 27, 1970

Inventor(s)  Chris R. Rasmussen

It is certified that error appears in the above-identified patent and that said Letters Patent are hereby corrected as shown below:

Column 2, formula (IIb) should be corrected by inserting a single bo between the nitrogen and sulfa atoms so as to complete the two-ring struc Same column line 53, there should be a parenthesis after the word "ethoxycarbonyl" and before "methyl". Column 3, line 10, the word "absorber" is mispelled. Column 5, Example VII, the phrase "2,3(3H)" sho read -- 2,4(3H) --. Same example, line 12, there should be an end of parenthesis after "(3H" and before the word "dione". Same column, line 23, the end of parenthesis after the word "carbamoyl" should be deleted.

SIGNED AND
SEALED
JUN 3 0 1970

(SEAL)
Attest:

Edward M. Fletcher, Jr.
Attesting Officer

WILLIAM E. SCHUYLER, JR.
Commissioner of Patents